(12) United States Patent
Karns et al.

(10) Patent No.: US 7,370,012 B2
(45) Date of Patent: May 6, 2008

(54) ELECTRONIC PAYMENT SYSTEM

(75) Inventors: Michael Karns, Exeter, RI (US); Nigel Beaney, Bucks (GB); M. John Mathieu, Greenville, RI (US); Miroslaw Kula, Cranston, RI (US)

(73) Assignee: GTECH Rhode Island Corporation, West Greenwich, RI (US)

( * ) Notice: Subject to any disclaimer, the term of this patent is extended or adjusted under 35 U.S.C. 154(b) by 514 days.

(21) Appl. No.: 10/819,705

(22) Filed: Apr. 7, 2004

(65) Prior Publication Data

US 2004/0267663 A1 Dec. 30, 2004

Related U.S. Application Data

(60) Provisional application No. 60/461,457, filed on Apr. 9, 2003.

(51) Int. Cl.
*G06Q 40/00* (2006.01)
(52) U.S. Cl. .............. 705/39; 705/64; 705/656
(58) Field of Classification Search ........... 705/39, 705/64, 65
See application file for complete search history.

(56) References Cited

U.S. PATENT DOCUMENTS

| | | | |
|---|---|---|---|
| 5,940,510 A * | 8/1999 | Curry et al. ............... 705/65 |
| 6,199,048 B1 | 3/2001 | Hudetz et al. |
| 6,394,354 B1 | 5/2002 | Wilz, Sr. et al. |
| 7,076,458 B2 * | 7/2006 | Lawlor et al. ............. 705/35 |
| 7,206,759 B1 * | 4/2007 | Nicoll et al. .............. 705/35 |
| 7,209,733 B2 * | 4/2007 | Ortiz et al. ............. 455/414.1 |
| 7,209,903 B1 | 4/2007 | Mamdani et al. |
| 7,240,036 B1 | 7/2007 | Mamdani et al. |
| 2001/0007334 A1 * | 7/2001 | Wilz et al. ............. 235/462.15 |
| 2001/0051915 A1 * | 12/2001 | Ueno et al. ............... 705/39 |
| 2001/0054111 A1 * | 12/2001 | Lee et al. ............... 709/245 |
| 2002/0042722 A1 * | 4/2002 | Tsuji et al. ............... 705/1 |
| 2002/0042753 A1 * | 4/2002 | Ortiz et al. ............... 705/26 |
| 2002/0046116 A1 * | 4/2002 | Hohle et al. ............... 705/14 |
| 2002/0060246 A1 | 5/2002 | Gobburu et al. |
| 2002/0062281 A1 * | 5/2002 | Singhal .................... 705/39 |
| 2002/0071076 A1 * | 6/2002 | Webb et al. ............... 349/117 |
| 2002/0152179 A1 * | 10/2002 | Racov .................... 705/67 |

(Continued)

FOREIGN PATENT DOCUMENTS

GB 2361570 A 10/2001

(Continued)

OTHER PUBLICATIONS

Bawden, T., "PayPoint and One 2 One Link up for Bill Payments," Marketing Week, p. 8, Mar. 30, 2000.*

(Continued)

*Primary Examiner*—Nicholas D. Rosen
(74) *Attorney, Agent, or Firm*—Williams Mullen, P.C.; Thomas F. Bergert

(57) ABSTRACT

An electronic payment system and method facilitates electronic commerce through controlled transfer of identification and value representations to wireless devices. The system includes a payment collection apparatus and a transaction apparatus, and provides for representation of user and transaction information via machine-readable indicia. In one embodiment, the machine-readable indicia is a barcode. The present invention is useful in such example applications as credit transactions, lottery system operations, and mobile top up applications.

17 Claims, 7 Drawing Sheets

U.S. PATENT DOCUMENTS

| | | | |
|---|---|---|---|
| 2002/0156728 A1* | 10/2002 | Jaschhof et al. | 705/39 |
| 2003/0041022 A1* | 2/2003 | Battle et al. | 705/39 |
| 2003/0050896 A1* | 3/2003 | Wiederin | 705/64 |
| 2003/0057284 A1* | 3/2003 | Challa et al. | 235/462.46 |
| 2003/0115463 A1* | 6/2003 | Wheeler et al. | 713/170 |
| 2003/0126076 A1* | 7/2003 | Kwok et al. | 705/40 |
| 2003/0233318 A1* | 12/2003 | King et al. | 705/39 |
| 2004/0049454 A1* | 3/2004 | Kanno et al. | 705/39 |
| 2004/0128237 A1* | 7/2004 | Obe | 705/39 |
| 2004/0139004 A1* | 7/2004 | Cohen et al. | 705/39 |

FOREIGN PATENT DOCUMENTS

| | | |
|---|---|---|
| KR | 2002093372 A * | 12/2002 |
| WO | WO 00/03328 A | 1/2000 |
| WO | WO 00/65509 A2 | 11/2000 |
| WO | WO-0157758 A1 * | 8/2001 |
| WO | WO-02086785 A1 * | 10/2001 |

OTHER PUBLICATIONS

Anon., "ProPay Introduces New Personal Payments Service," Card News, vol. 15, No. 11, May 31, 2000.*

Anon., "Technocash Available," ABIX—Australasian Business Intelligence, p. 12, Aug. 25, 2000.*

Anon., "Virtual Cash on the Net," ABIX—Australasian Business Intelligence, p. 6, Aug. 28, 2000.*

Ashton, K., "'Pre-Paid' E-Commerce Makes Net More Viable" ABIX—Australasian Business Intelligence, p. 35, Sep. 22, 2000.*

Anon., "DoCoMO, Others to Test Cell-Phone-Based E-Commerce Service," Nikkei Net Interactive, Aug. 9, 2001.*

Anon., "Winning in the Mobile Commerce Arena," European Banker, p. 6, Sep. 2001.*

Anon., "Key Factors in Place for Next-Generation Mobile Boom," South China Morning Post, Jul. 9, 2002.*

* cited by examiner

ELECTRONIC PAYMENT SYSTEM

CROSS-REFERENCE TO RELATED APPLICATIONS

This application claims the benefit of U.S. Ser. No. 60/461,457, filed Apr. 9, 2003 and entitled "Electronic Payment System".

TECHNICAL FIELD

The present invention relates to a payment and credit system, and more particularly to a system and method for facilitating execution and processing of consumer transactions.

BACKGROUND ART

Since the introduction of the general purpose credit card in the 1950's, consumers have had an increasing number of options for paying for goods and services. The credit card, for example, provided the consumer with an opportunity to pay for goods and services using future money, or money the consumer had not yet earned. Frequent flyer or frequent purchaser programs have allowed consumers to redeem earned miles or points towards goods, services or value add-ons to purchased items. These miles or points are not necessarily tied to a currency equivalent value. Debit cards, introduced in the 1970's, have made it possible for consumers to purchase items using their own banked funds, much like a replacement for cash.

Recent legislation and worldwide banking and industry practices are providing a clear indication of the foreseeable future representation of money—i.e., representation in an electronic format.

There are many examples from recent years of the transformation from a paper-based money system to an electronic one. In the consumer setting, the Internet has given many consumers the option of shopping in the comfort of their own homes, workspaces, or even while mobile. Typically, an Internet shopper will provide his or her credit card information when making an "online" purchase. The credit card information is validated before the service proceeds to record the transaction and consummate delivery of the purchased product or service to the consumer.

The particular commercial application often determines the form in which information and representations of value are transferred in electronic commerce. In some commercial applications, there are several methods for executing transactions electronically, each with their own way of handling information and representations of value. For example, a pre-pay mobile phone subscriber has several options for depositing funds to or "topping up" his or her account.

First, a user may purchase a voucher at a retail location, whereupon the user may dial the phone number on the card and interact with either a live voice or an interactive voice response (IVR) system to add the voucher's value to his or her account. The user's account number is typically the same as his or her phone number. A second means of topping up a mobile phone account is via magnetic stripe card. In this example, the user provides their mobile phone service provider with billing and personal data to set up an account, and receives a magnetic stripe card, much like a credit card, from the service provider. When the user desires to top up their account, the user provides payment at a retail location along with their card. The retail clerk then swipes the card and keys in the amount corresponding to the user's payment, and the user's mobile phone account becomes credited in the amount of payment. As in the voucher method, the user's account number can be his or her phone number. A third method of top up allows the user to charge their top up to another account using the services of an automated teller machine (ATM). In this method, the user swipes his or her credit card, then indicates (through card swipe or key entry, for example) his or her mobile service provider, telephone number and amount of top up in order to credit their account.

In each case, information is transferred in different ways, and the representation of value takes different forms. In the voucher system, identification information may be provided by voice or keypad entry, while in the magnetic stripe card system, identification information is represented on the magnetic stripe card. Also, in the voucher system, value is represented in the voucher itself, while in the magnetic stripe system, value is represented by the number keyed in at the retailer location. In either case, the user can receive a printed receipt for payment at the retail location, and the user may also receive a text or other message on their mobile device from their mobile service provider, confirming the top up transaction.

Drawbacks arise in each case as well. While the paper-based voucher system may better maintain user anonymity, it also creates inventory problems for retailers, theft problems for retailers and users, and requires resource expenditures (e.g., live support or IVR system) for the mobile phone service provider. The magnetic stripe card system avoids the inconvenience of having to dial into an IVR system to activate the top up, but requires that users carry around an additional card in their wallets and register personal and billing data. This system has proven highly unappealing to users desiring to protect their personal information.

SUMMARY

The present invention relates to an electronic commerce system with a particular application as a system and method of mobile top up. The system includes a payment collection apparatus and a transaction apparatus, and provides for representation of user and transaction information via machine-readable indicia. In one embodiment, the machine-readable indicia is a barcode.

PREFERRED MODE(S) FOR CARRYING OUT THE INVENTION

Figure 1:
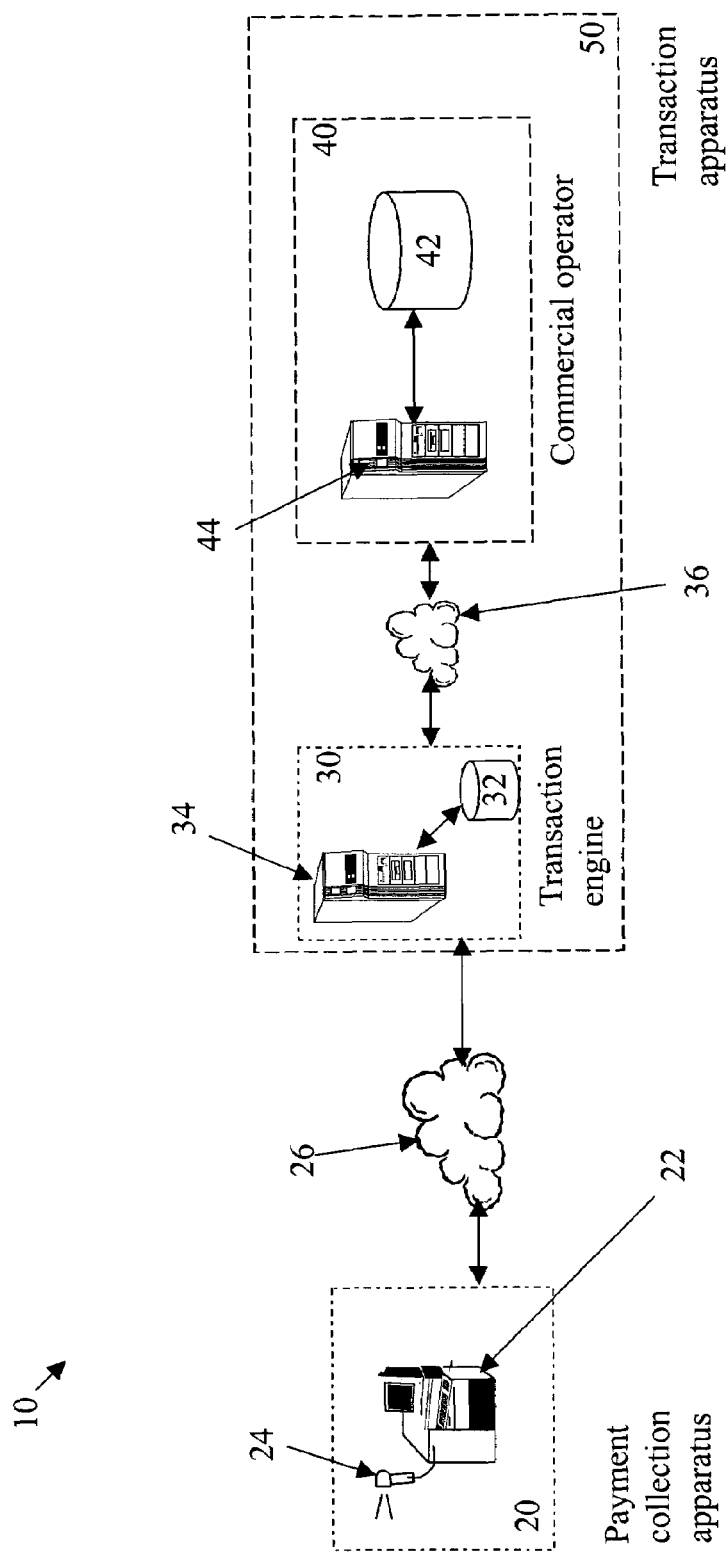
FIG. 1 is a diagram showing an architectural layout of one embodiment of the system of the present invention.
Figure 6:
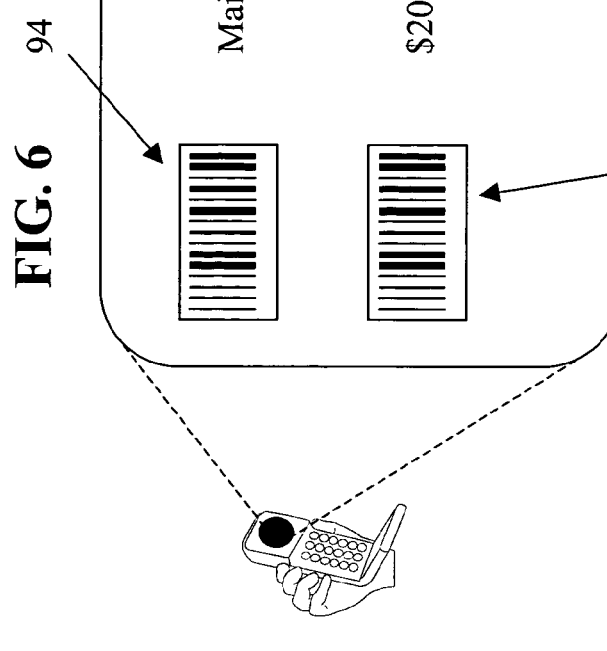
FIGS. 5 through 7 show example displays capable of representation on the display of a mobile device in connection with one embodiment of the present invention.
Figure 7:
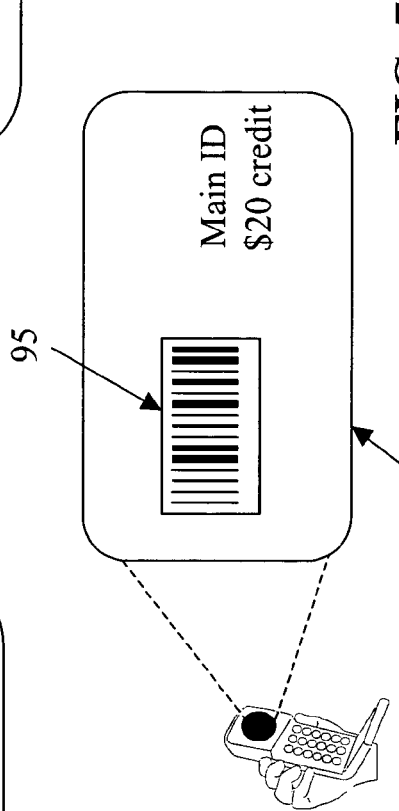
Figure 8:
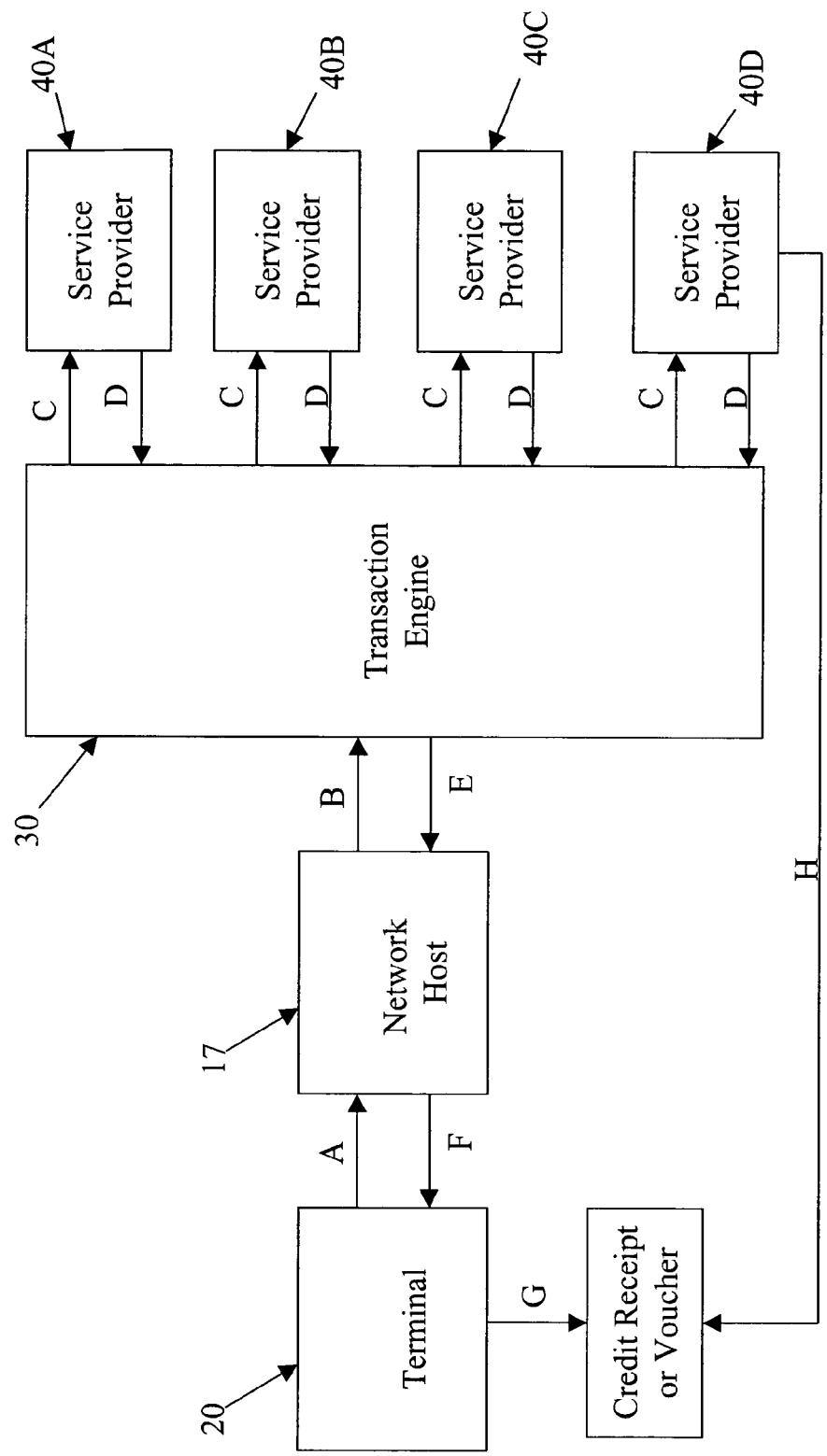
FIG. 8 is a block diagram showing information flow in accordance with one embodiment of the present invention.

As shown in FIGS. 1 through 9, there is provided an electronic commerce system 10 for facilitating consumer transactions and transaction processing. As shown in FIGS. 1 and 8, the system includes a payment collection apparatus 20, a transaction engine 30, and at least one service provider system 40. The transaction engine and service provider system can comprise the transaction apparatus 50.

The payment collection apparatus 20 includes capabilities to receive cash, credit or other payment, through human interaction or via automated means. Examples of automated machines include automated teller machines (ATMs), public transportation and other ticketing machines, and self-serve lottery kiosks. A traditional retail store is an example of a human-assisted payment collection apparatus. In the case of a cash transaction processed locally at the point-of-sale (POS), the means for accepting payment may be the keyboard and associated processing which allows physical receipt of cash to be confirmed by key entry or touch screen. In the case of an automated machine, the means for accepting payment may be an appropriate mechanical system, for example as used in known vending machines. In the case of payment by credit card, the means for accepting payment may be a conventional device for reading data stored on the credit card or entering the number of the credit card. The payment collection apparatus includes means for receiving all types of payment, including cash, check, coupon, gift certificate, debit card or credit card, for example.

The payment collection apparatus further includes the capability to transmit and receive transaction-related information. Appropriate communications hardware and software can be provided to transmit and receive information through an information network 26. The present invention can provide for payment processing to occur at the location of the payment collection apparatus (e.g., item 20 in FIG. 8), or remotely, such as at a host server 17 (see FIG. 8) in communication with the payment collection apparatus via local area network or other appropriate communications network.

Figure 2:
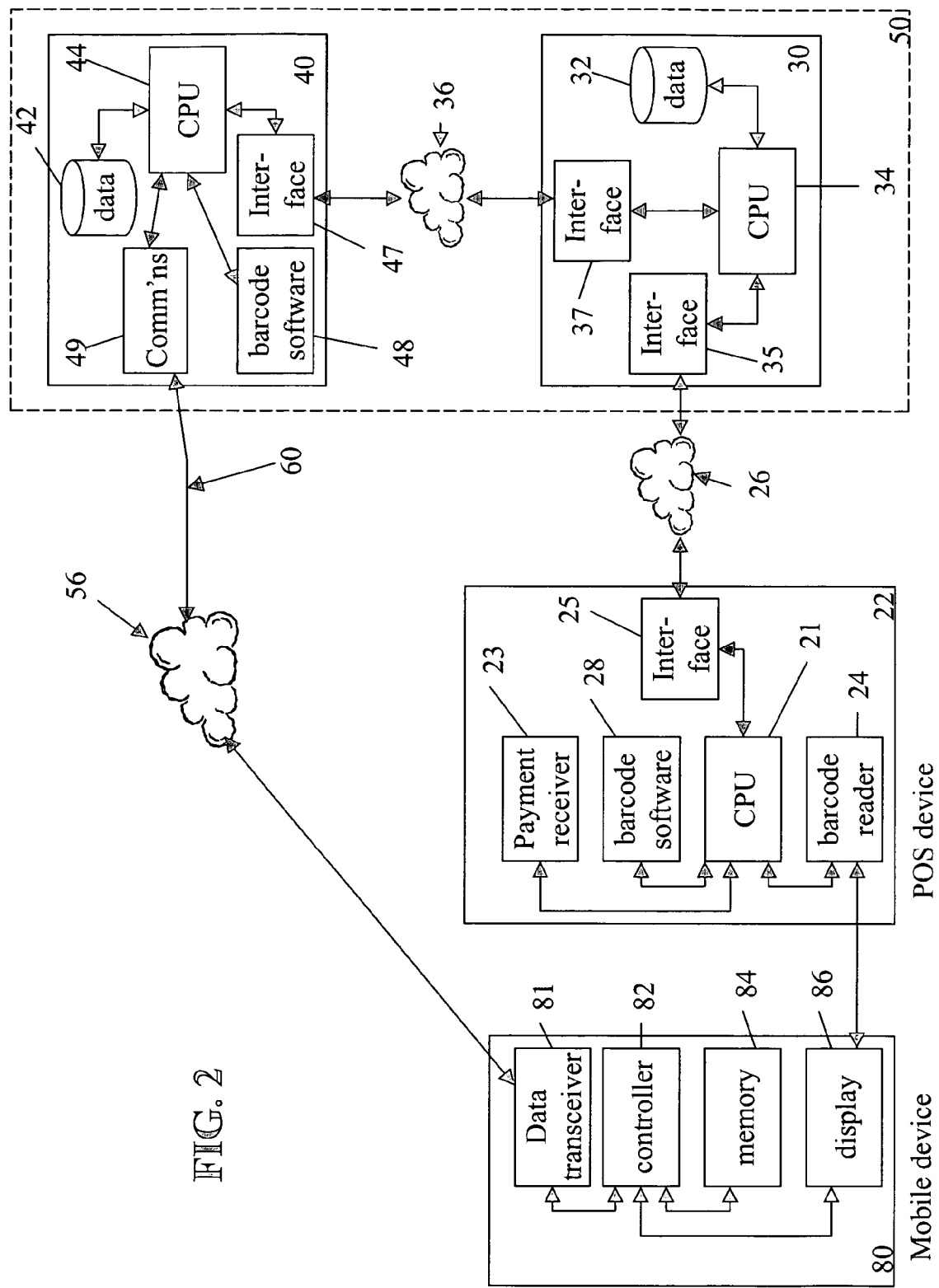
FIGS. 2 and 3 are diagrams showing example implementations for a user interacting with a commercial account via a mobile device in connection with the system of the present invention.
Figure 3:
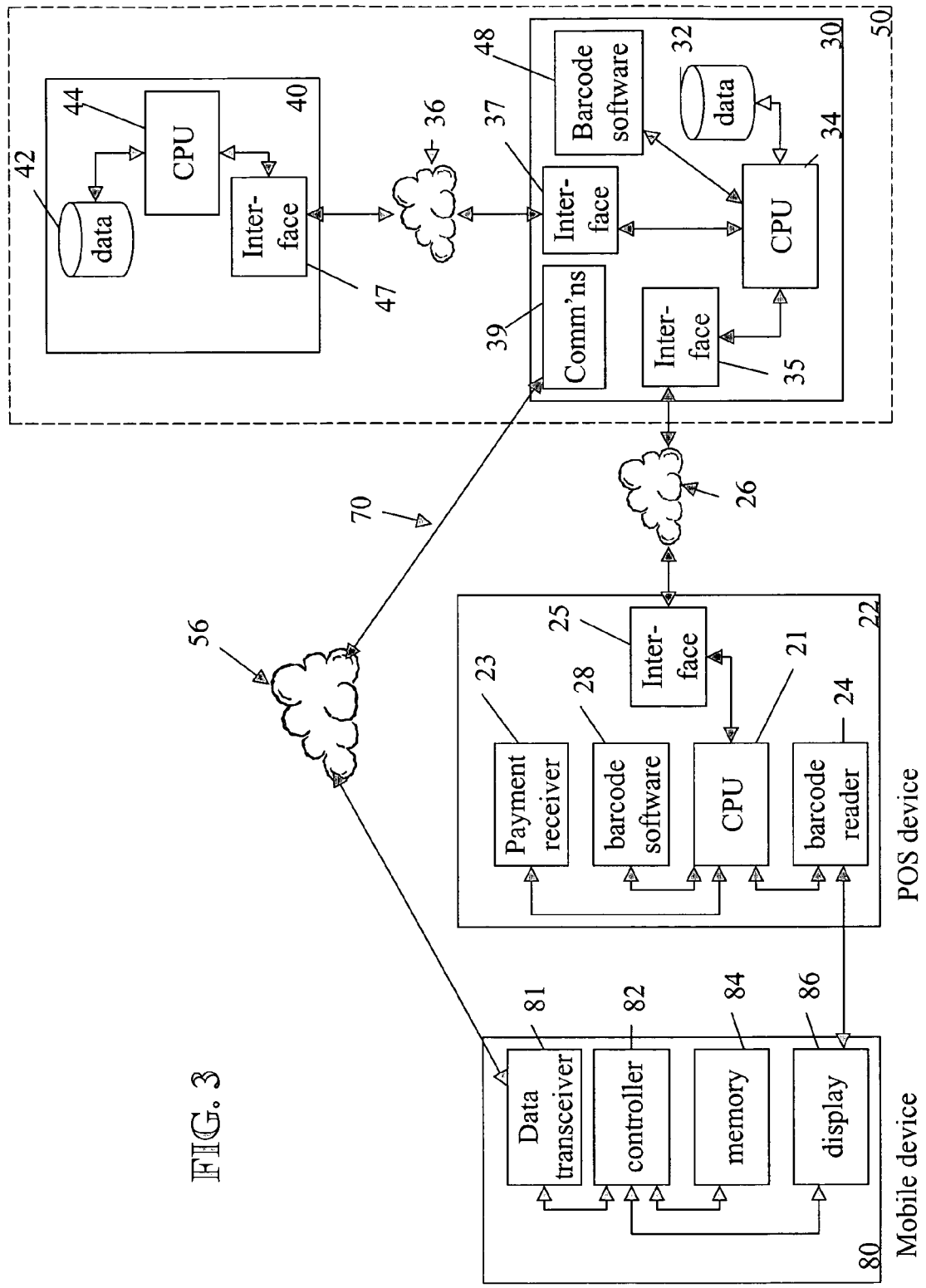

In one embodiment, as shown in FIGS. 1 through 3, the payment collection apparatus 20 can be a retail point-of-sale (POS) device 22 having a CPU 21 and payment receiving means 23 as is known in the art, whereby the device 22 is capable of reading machine readable indicia for executing transactions. For example, the POS device 22 may be provided with credit card processing equipment, or with a scanner or other visual detection system 24 which can detect transaction or identification indicia provided by the user. In one embodiment, the scanner can detect a barcode or data string representation of user identification information. In another embodiment, the scanner can detect a barcode or data string representation of the user's desired transaction. Some retail terminals may have been previously outfitted with such reading 24 and communications 26 abilities, such as, for example, retail terminals having lottery processing capabilities. In this embodiment, the system of the present invention can leverage the previously existing infrastructure of the lottery network to facilitate customer interaction, network connectivity and transaction processing.

In one embodiment, the payment collection apparatus 20 may further be provided with an interpretation component, such as a software program 28, for manipulating received information into another format. For example, if the payment collection apparatus receives a barcode representation of user identification information, the interpretation component may translate the barcode information into a processed message representation of the user's identity, such as an ASCII text or other message format. This translated information can then be provided to the transaction component via interface 25, as described more completely hereinafter.

Transaction Apparatus

The transaction apparatus 50 can comprise an acquiring processor or transaction engine 30 and one or more commercial operators 40 having processing capabilities and means for interacting with the transaction engine 30.

The transaction engine 30 includes a storage 32 and a processing 34 component for respectively storing and processing information about transactions, including information about user identification and authentication, transaction type, transaction amount, and service provider designations. In one embodiment, service providers or commercial operators 40 can provide a means for the transaction engine 30 to associate or map transactions to particular user accounts, such as by providing a defined information format for processing the transaction, for example. The service provider can also indicate to the transaction engine what transaction types are available for the given service provider. In a further embodiment, the transaction engine can provide a menu of available transactions from which the service provider chooses. For example, the transaction engine may accommodate the processing of transactions whereby one user desires to credit the account of another. However, the service provider may choose not to offer such transaction capabilities.

Service provider designations allow the transaction engine 30 to segment and process each individual transaction according to the service provider implicated. For example, if a transaction relates to topping up a pre-paid mobile telephone account, the information received from the consumer would include the user's mobile service provider, account number, and the amount to be credited or topped up to the account.

The transaction engine storage component 32 can store user identification information separately or together with transaction information. The use of a separate user database and transaction database is advantageous, because it allows the present invention to be implemented using an existing account database of a mobile network operator in the top up example, by newly introducing a transaction database. It also allows the present invention to be implemented using a single, transaction database in combination with plural account databases, for example for different mobile network operators in the top up embodiment, for example. This in turn facilitates implementation of the present invention for different mobile networks. Lastly, the use of a separate transaction database facilitates the application of the present invention to areas such as lottery ticket processing, credit card processing and other areas using a single transaction database. To implement the account database and transaction database separately, the databases may be provided in a separate account server and transaction server, respectively, with a communications link therebetween, as is known in the art.

The transaction engine 30 can process transactions with each service provider 40 in real-time or in batch at determined time intervals via communications link 36. Various types of information may be processed and passed from the transaction engine to the service provider, including the account number of the consumer interacting with the system, the amount of the desired transaction, the desired transaction type, the account numbers of any other affected account holders, and confirmation type request, for example.

The confirmation type can be a user-requested form of confirmation, whether as a printed receipt, a text message, or a display within a network-accessible account.

Service Provider System

The service provider system 40 can include a storage 42 and a processing 44 component for respectively storing and processing information about transactions, including information about user identification and authentication, transaction type, and transaction amount. The service provider 40 may be a mobile operator or mobile virtual network operator allowing consumers to use the system of the present invention to top up or credit their pre-pay mobile phone accounts. The description of a mobile operator as a service provider is illustrative only, as the service provider may be a credit card provider or other suitable commercial entity desiring to implement the payment system of the present invention.

The service provider storage component 42 can be an account database for storing information related to each customer account. A customer's account is created upon the customer's initiation of service with the mobile operator. At the time of initiation of a pre-pay account, the customer provides or is provided with a telephone number, an account number (if different from the telephone number) and an account value based upon the customer's initial payment. As the customer uses his or her mobile phone, the account value is debited based upon the terms agreed upon between the mobile operator and the customer. The customer can use the system of the present invention when desiring to add value to his or her account, or the account of another mobile subscriber.

The mobile operator processes pre-pay transaction requests received from the transaction engine and issues electronic top-ups in the form of credit receipts or vouchers. A credit receipt can be an indication that the customer's account has been instantly credited. A voucher represents a prepaid credit, but requires further customer interaction before an account will be credited in the voucher amount. The voucher can be attributed to a particular user's account or non-attributed.

As shown in FIGS. 2 and 3, the transaction apparatus 50 can send messages from the service provider as at 60 or the transaction engine as at 70 in the form of text or images to the user's mobile device 80. The messages can represent receipt information, credit information, identification information and transaction information, such as a credit or voucher transaction. Receipt information may simply be a text message indicating that the user has completed a transaction in connection with the service provider. Credit information can be text information provided to the user concerning his or her account, such as balance information. Identification information can be a barcode or other image information sent in response to a user request for a top up or other transaction. Transaction information can be a barcode or other image representation of an attributed or non-attributed credit or voucher transaction. The transaction engine 30 and the service provider processor can be provided with barcode software 48 to assist in this implementation. An example of such barcode software includes Wasp™ barcode software, commercially available from Wasp Bar Code Technologies, Plano, Tex., USA. In one embodiment, the present invention can accommodate both identification and transaction information in a single image or barcode representation.

Various types of mobile devices, including personal digital assistants and mobile phones, are capable of interacting with the present invention. For optimal cooperation, a mobile phone or any mobile device for use with the present invention will be capable of transmitting text messages and short message service (SMS) via data transceiver 81, and will have a controller 82, a memory 84 and a visual display area 86. Example such phones are commercially available from Motorola Corporation, Miami, Fla., USA, and Nokia Corporation, Suomi, Finland.

As shown in FIGS. 2 and 3, the service provider 40 or the transaction engine 30 can be provided with means 49, 39 for communicating the message to the user's mobile device, as well as means for receiving communications from the user. As shown in FIG. 3, the transaction engine 30 may communicate with the user and may perform transaction processing in lieu of the service provider in the embodiment where the transaction engine 30 acts as a stand-in for the service provider. Such may be the case where the service provider's system is temporarily not operating, or where the service provider has delegated real-time responses to the transaction engine 30. In such case, the transaction engine may hold transaction information for the service provider until such time as a file or batch transfer can be made.

The means by which the service provider or transaction engine sends and receives communications with a user's device 80 can include communications software designed to operate over a wireless network 56, for example. In one embodiment, the message is communicated to the user's device only upon the user's request for transaction information. In this embodiment, the system can operate to automatically identify the user's account by the user's telephone number, because the mobile device may be identified directly from the request message. The request message also provides the advantage of providing a simple mechanism by which the user can register the desire to credit the account simply by sending a request message to a predetermined number.

In one embodiment, the request message can be blank so that mere receipt of a message at a predetermined telephone number indicates the desire to credit the account. In a further embodiment, different telephone numbers can be used to designate different payment amounts, or the payment amount might not be specified at all. In still a further embodiment, the text message can include simple text identifying the desired payment amount. However, use of such a request message is not essential. A request could be made by any other means, such as a voice call.

In another embodiment, the user can establish rules with the service provider or the transaction engine for when a message is to be communicated. For example, the user may desire an attributed voucher be sent to its mobile device anytime his or her account balance falls below a predetermined amount. An attributed voucher can take the form of a barcode representation of the user's identification information combined with the amount desired to be deposited or topped up. A non-attributed voucher can take the form of a barcode representation of a top up amount, which would require some form of user identification in order to be attributed to a particular account. Upon fulfillment of the non-attributed voucher, the account deposit would be credited to the individual fulfilling the transaction, whether or not the individual is the party who paid for the voucher.

While the system is described in terms of permitting crediting or topping up of a pre-paid mobile phone account, the system can be adapted for use in credit transaction processing, rewards systems, or gift certificate systems, for example. In several embodiments, the system of the present invention can convert the payment amount to an equivalent non-currency value, such as minutes of phone service, for example. The transaction engine can perform such conversions depending upon the application involved.

Communications

The present invention can be implemented using the TCP/IP communications transport protocol, as will be well understood to those skilled in the art. Redundant, high bandwidth communications links, such as frame relay with ISDN dial backup, can be employed for additional backup support, such as between the transaction engine 30 and the service provider component 40 as at 36.

Appropriate communications and application interfaces 25, 35 are also provided between the payment collection apparatus and the transaction engine, and between the transaction engine and the service provider component, such as at 37, 47. In one embodiment, ISO 8583 and XML are the preferred real-time application messaging interface standards used for communications between the transaction engine and the service provider processor. For end of day and weekly invoicing, periodic batch file interfaces can be used.

Barcodes

Barcodes are well-known data representation formats, and can appear in one-dimensional or two-dimensional form. The one-dimensional version uses a sequence of vertical bars and spaces to represent numbers and other symbols. A 1-D barcode reader such as used in connection with the present invention uses a laser beam that is sensitive to the reflections from the line and space thickness and variation. The reader translates the reflected light into digital data that is transferred to a computer for immediate action or storage. A 2-D barcode reader can comprise a web-cam type device such as the Quadrus™ reader manufactured by Microscan, Inc. of Renton, Wash., US. The two-dimensional barcode can represent large amounts of information in a restricted area.

Any format for the one or two-dimensional barcode can be used in connection with the present invention. In one embodiment, the barcode format is QR Code, but other possible formats include PDF417, Code 16K, Code 49, DataMatrix, Maxicode, Code One or Aztec Code. Further, while a stacked two-dimensional barcode may be used, a matrix two-dimensional barcode can increase the amount of data stored. The ability to store large amounts of data also provides the advantage that the barcodes may incorporate error correction capability to allow recovery from data corruption, as well as other encoding algorithms to enhance security, for example.

Supplying the image as a message takes advantage of the existing messaging functionality of the mobile device. This allows the device to store the images without the need for any special software and provides for ease of use by the user.

The present invention may use any type of messaging for transmitting a message to a mobile device, including SMS, MMS, EMS or WAP. SMS (Short Message Service) is a service for sending messages of up to 160 characters (224 characters if using a 5-bit mode) to mobile phones that use Global System for Mobile (GSM) communication. SMS messages can be sent to digital phones from a web site equipped with PC Link or from one digital phone to another. An SMS gateway is a web site that allows users to enter an SMS message to someone within the cell served by that gateway or that acts as an international gateway for users with roaming capability. Thus, in one embodiment of the invention, a first user may use an SMS gateway to send a prepaid voucher to another user via SMS.

Multimedia Messaging Services (MMS) is currently being adopted by most network operators and mobile device manufacturers, and supports standard image formats such as GIF and JPEG, video formats such as MPEG 4, and audio formats such as MP3, MIDI and WAV. MMS technology works in existing GSM networks (over WAP, the industry standard protocol for mobile data exchange) and with high speed 3G technologies. Enhanced Messaging Service (EMS) allows for the sending of multi-media messages, consisting of pictures, melodies, animations and styled text. If an EMS message is delivered to a mobile phone that does not have EMS software, the user will only see the text in the same way as an SMS message. EMS works with the existing infrastructure laid down for SMS, and can be used within the current GSM infrastructure.

Despite the advantages of the image being transmitted in the form of a message, this is not essential. It would alternatively be possible to transmit the transaction data to the mobile device in a data format from which the mobile device would generate the graphical representation. This would, however, require appropriate software to be provided on the mobile device.

While one or two-dimensional barcodes can assist in the implementation of the present invention, the graphical representation of data may be in any other format which allows the data to be read by a reader at the retail system. Such formats can include representation of the data by characters to be read by a reader incorporating an optical character recognition system.

Message Representations

As described above, messages in connection with the present invention can represent different types of information and values depending upon the particular aspect of the invention involved. As such, the system of the present invention accommodates all manners of desired transactions. For example, a user can make payment towards a real-time credit to their account or for the receipt of a voucher for later use. A user can also provide a credit payment for another user's account, and can forward vouchers to other users for their independent use.

The present invention also provides flexibility to the user who may wish to store activated, non-attributed vouchers for use in geographical areas where the user does not want to carry cash, for example. The type of transaction is dependent upon the service provider's available menu of desired transactions and the customer's desired transaction.

Processing

Figure 4:
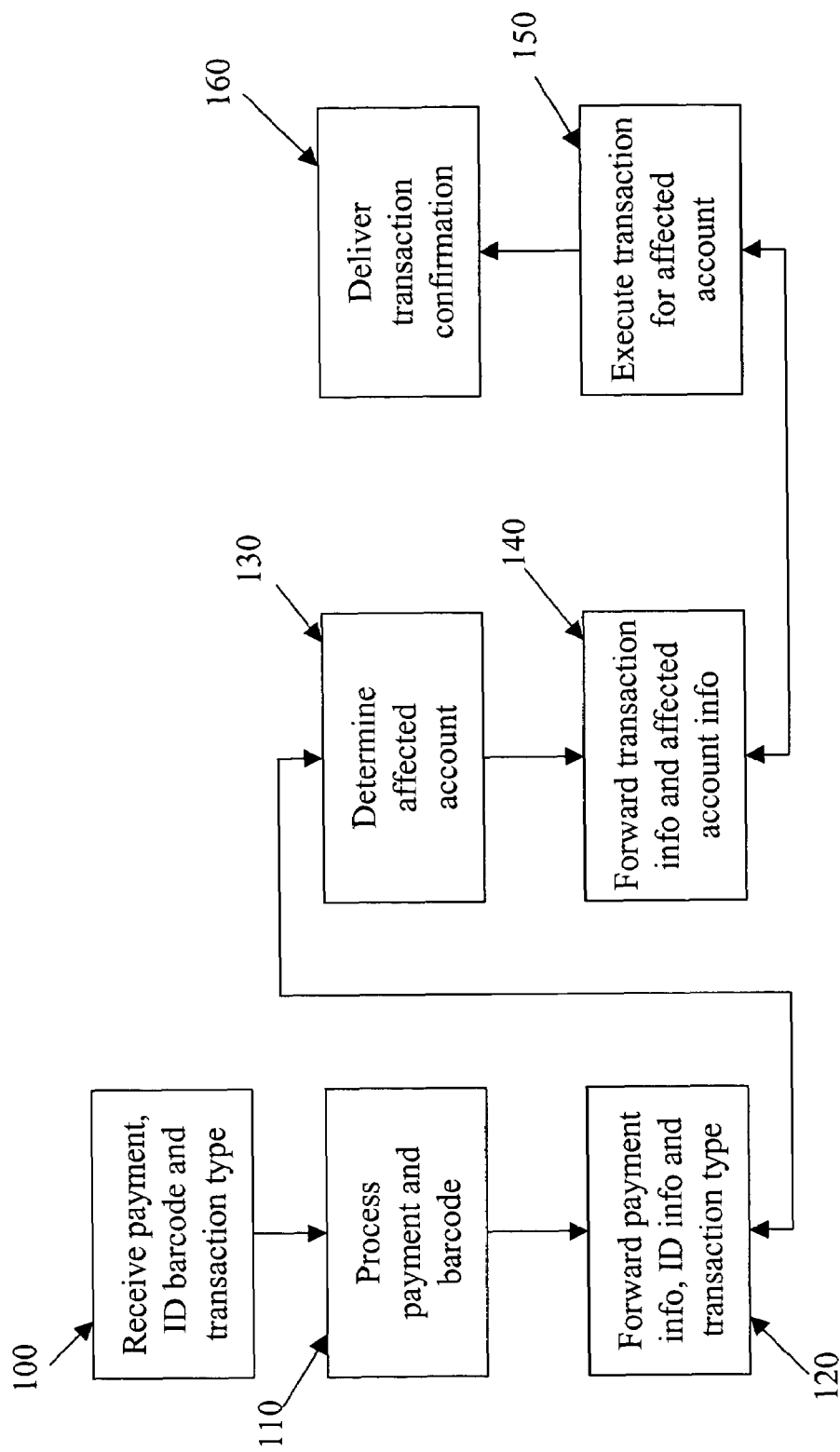
FIG. 4 is a flow diagram showing process steps involved in connection with topping up a mobile phone account in accordance with one embodiment of the present invention.

FIG. 4 is a process flow diagram indicating the steps for consummating a transaction in one embodiment of the present invention. As at 100, the user presents payment to the payment collection apparatus along with identification information, such as an identification barcode, and an indication of the type of transaction desired. The account identification information in the form of a barcode can be displayed on the user's mobile phone display according to methods known in the art. The account identification information may further be integrated into the mobile device such that it does not appear on the visual display of the device. In one embodiment of the invention, the barcode is embedded within the device itself.

Appropriate authentication means can be implemented at this stage in order to forestall potential fraud. In one embodiment, the transaction engine can include means for authorizing or authenticating the user prior to allowing a transaction to be consummated, such as by checking the user database according to predetermined rules. The payment collection apparatus can be set up to block payment until receipt of the authorization by the retail system. In one embodiment, biometric authentication can be employed, such as voice recognition software capable of matching the user's spoken inputs into the mobile device with pre-stored voice inputs.

The account identification information may be retrievable from the memory of the wireless device, or it may be requested and/or sent from an account maintaining entity. This entity may be the mobile service provider, or it may be the transaction engine as described above. The request can come in the form of a phone call to a given phone number, whereby once it is received, the mobile provider or transaction engine can then send an encoded message capturing the device user's identification to the wireless device. In an alternative embodiment, the service provider may monitor the user's account and automatically send a notice to the user's device prompting the user for a top up before the account is depleted.

Figure 5:
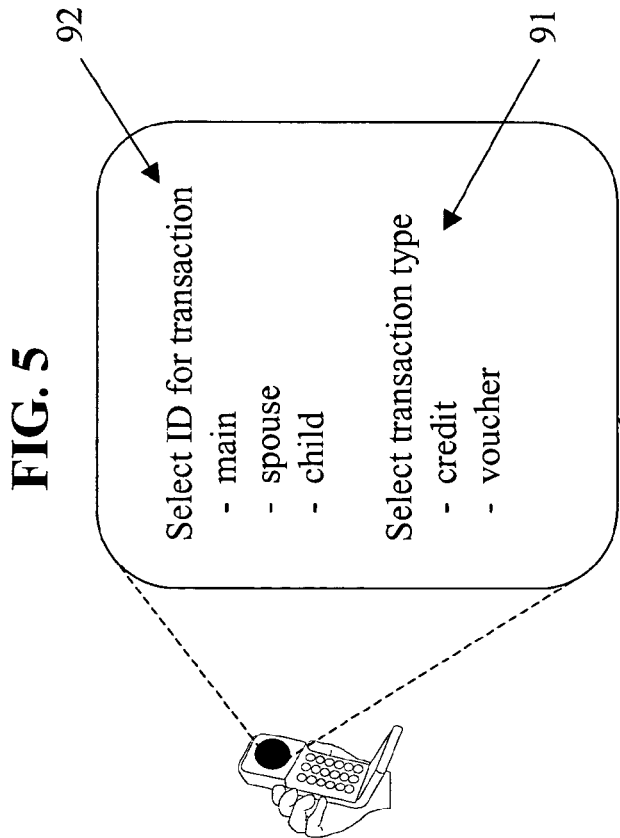

In one embodiment as shown in FIG. 5, the user can select a desired transaction 91 and a desired account 92 from a menu on the mobile device display 86. In the case of retrieving information from the device memory, the user may desire to store additional identification codes besides their own on their mobile device, such as family members or other individuals. Such option would allow the user the opportunity to credit a family member's account without having to recall their account number or phone number, and without having to request the delivery of a barcode from the service provider.

The transaction type can be orally communicated to a retail attendant, such as, "Please top up $20." Or the transaction type can be communicated via information contained in machine-readable form, including a transaction barcode. In one embodiment, the transaction barcode 93 and the identification barcode 94 are shown separately on the display 86 of the mobile device, such as shown in FIG. 6. In another embodiment, the transaction information and identification information are embodied on the display 86 in a single barcode 95, as shown in FIG. 7. It will be appreciated that identification and transaction information need not be limited to the display of the device, nor to a barcode representation.

Once the user has provided payment, identification information and/or transaction information, the system can process the payment and any coded information so as to begin consummating the transaction, as at 110 in FIG. 4. As at 120, the payment collection apparatus forwards the payment information, identification information and transaction details to the transaction engine for further processing. As at 130, the system determines what account or accounts will be affected by the desired transaction. In this step, the system can manipulate the information as necessary depending upon the transaction type. For example, if the system is to take the user's payment (e.g., $20) and convert the payment into a certain number of minutes of telephone calling time, the transaction engine could perform that step at this stage. As at 140, the system sends the determined information to the service provider for appropriate account adjustment and execution of the transaction at 150. At 160, the system determines the appropriate confirmation form and delivers the confirmation to the user.

If the user's request is to receive an electronic voucher, the transaction engine or the mobile service provider may send a machine-readable representation of a paid-for voucher via text message. The user may store this code on his or her device for a single use. The user may also forward the code to another user for their single use. Appropriate security measures are in place such that, if the code is transferred to more than one party, the code is only valid for the party who has most recently received the code. In another embodiment, the code can be regarded by the system as invalid once it has been used. In still another embodiment, the code can be deemed unauthorized unless more information is passed from the would-be redeemer, such as additional authentication information. Additional authentication information can be a personal identification number (PIN), passcode, biometric identification element, or other known authentication type.

Figure 9:
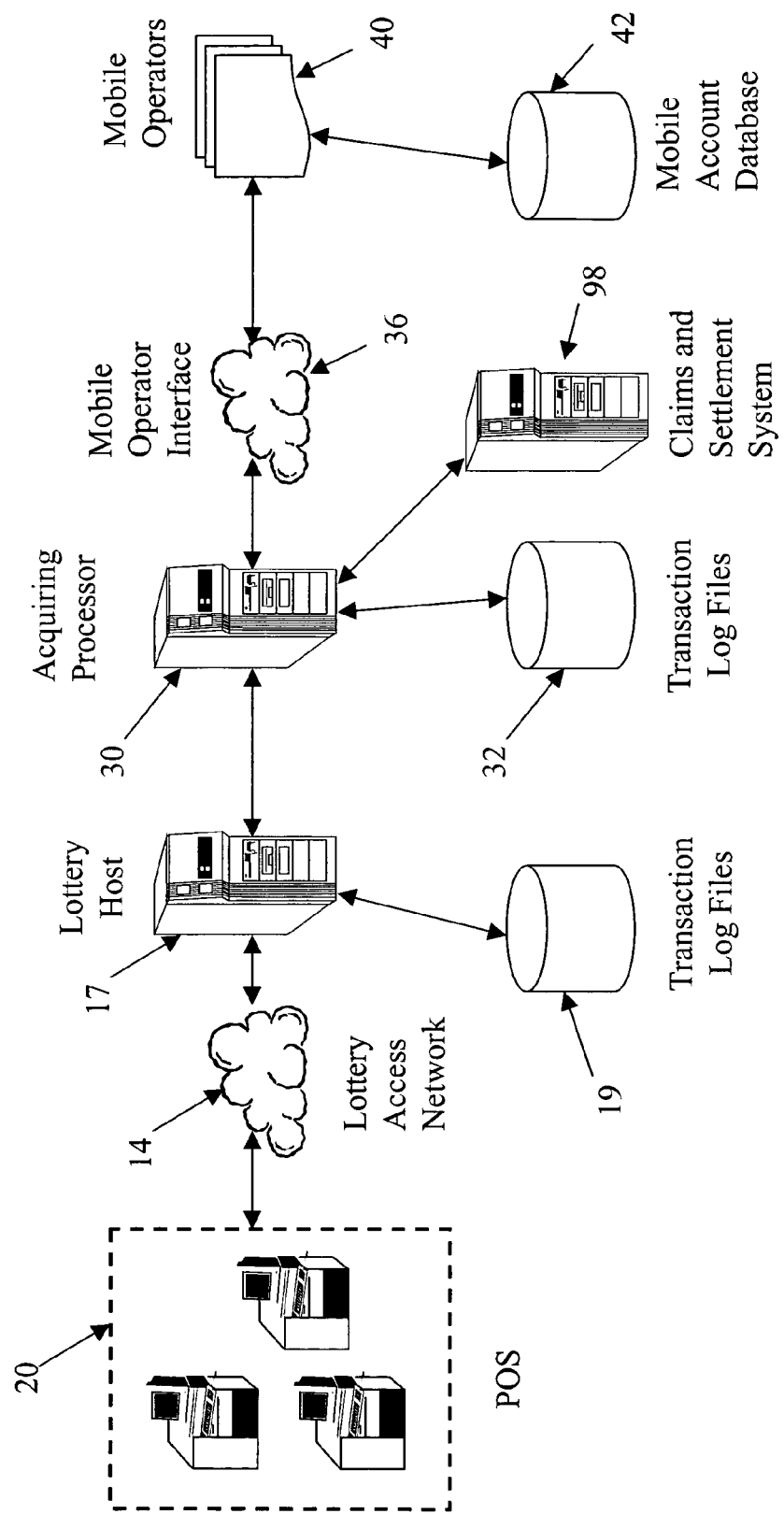
FIG. 9 is a diagram showing one embodiment of the system of the present invention implemented using a pre-established lottery infrastructure.

In the embodiment as shown in FIGS. 8 and 9, where an existing lottery or retailer infrastructure is employed to implement the present invention, a mobile customer may approach a lottery or retail terminal and request an electronic top-up (ETU) sale transaction for a specific mobile phone operator. It will be appreciated that such an architecture can be used for applications other than lottery or retailers, including a network of banks, for example.

As shown in FIGS. 8 and 9, a mobile phone customer can request an electronic top-up (ETU) sale transaction at the terminal 20 for a specific mobile phone operator (e.g., 40A). As described above, transaction entry methods can include manual key entry, play-slip entry, magnetic stripe card reading and barcode scanning. Input information can be processed by the terminal's ETU application and the transaction request is transmitted to the host 17 over network 14 for processing, as at step A. The ETU application operating at host 17 logs the transaction request in database 19 and forwards the request to the transaction engine 30 for processing, as at step B. The transaction engine ETU application can process the transaction request and forward the request to the corresponding service provider 40A, 40B, 40C or 40D over network 36 for processing in real-time, as indicated by step C.

The host or the transaction engine can decrypt the transaction information and perform transaction checks, such as DES encryption, checksum and system suppressions. Once the inbound request is logged and its message header decoded, a Trace Serial Number (TSN) can be assigned to the transaction. The TSN serves as a common transaction reference trace number between the lottery host and the transaction engine. The transaction engine can link the TSN to a Unique Transaction Identifier (UTI) constructed for interfacing with the mobile operator. The UTI may vary in format depending upon the mobile operator involved, and can typically contain an ETU identifier, a solution provider ID code, a distributor ID code, and a unique serial number.

A product routing code can direct the system to route the transaction to the transaction engine via Message Exchange (MX), for example, whereupon a timer can be set for transaction timeout while waiting on the transaction engine. The TSN and the UTI can be printed on ETU receipts to assist with troubleshooting as necessary. Message Exchange (MX) is a communications protocol that enables the transaction engine to communicate with a lottery host. Lottery hosts such as the AlphaGOLS™, EuroGOLS™ and ProSys™ systems are examples of hosts for use with the present invention. EuroGOLS™, AlphaGOLS™ and ProSys™ are commercially available from GTECH Corporation, West Greenwich, R.I., USA. The MX client/server architecture supports both push and pull message flow models, allowing both client and server systems to initiate message traffic and act as senders and receivers of messages. The client and server side processes implemented via MX are well-known in the art and do not necessitate detailed explanation.

Once the transaction engine 30 logs the request in database 32 and forwards the request to the designated service provider, the service provider processes the transaction request, records the transaction into the appropriate database 42 account, and sends the transaction engine a corresponding transaction response in real-time, as at step D. The transaction engine processes and logs the transaction response received from the service provider and sends the host a corresponding transaction response, as at step E. The host then logs the transaction response received from the transaction engine and sends the lottery terminal a corresponding transaction response, as at step F. Finally, the lottery terminal prints either an ETU credit receipt (sale amount has been credited to the customer's mobile account and is activated immediately or after a grace period) or an ETU voucher, as at step G. At step H, the service provider can also provide a text or image message to the user on the user's mobile device. This message can be a confirmation, or a non-attributed electronic voucher, depending on the user's transaction request.

In the lottery terminal example, the terminal may be, for example, an Altura™ model or an ISYS™ model, commercially available from GTECH Corporation, West Greenwich, R.I., and can be configured at sign-on with available mobile vendors and pertinent information, such as their products, messaging details and ETU parameters. The transaction may be entered via manual key entry, play-slip entry, magnetic card reading or by providing machine-readable indicia, such as a barcode, to a scanner at the lottery terminal. An ETU software application can be provided for the terminal for processing the input information and transmitting the request to the lottery host for further processing. In the system shown in FIG. 1, the information would be transmitted to the transaction engine 30 of the present invention.

As shown in FIG. 9, the system of the present invention provides for a claims and settlement system 98 in connection with the acquiring processor or transaction engine 30. The claims and settlement system 98 provides transaction settlement, auto-reconciliation, and claims management for retail operators and service providers. The system 98 also performs adjustments processing, transaction fee processing, and balancing, monitoring and reporting functions, while further supporting multiple settlement entity types, such as institutions, interchanges, banks, merchants, operators and terminals.

Multi-Lingual/Multi-Currency Support

The present invention can support communications in multiple languages and in multiple currencies. In one embodiment, the present invention can provide for currency conversion of credit transactions to allow individuals to deposit payment in a first currency for use with a mobile operator whose customer accounts are in a second currency.

Alternative Embodiments

The system of the present invention can be further adapted for additional applications. For example, barcode or other machine readable indicia can replace lottery tickets and/or play slips. A lottery participant may desire to receive a text message having a barcoded representation of a lottery ticket. Once paid for, the barcode may be scanned to activate, play and/or redeem the ticket. In one embodiment, the user can pre-establish a lottery account allowing the user to deposit funds into the account as represented by the barcode on the device display. The user may also request and pay for tickets against the account balance, as well as deposit winnings into the account through the use of the barcode on the user's wireless device display. In this embodiment, appropriate authentication information can be required.

As an additional example, the barcode may represent access to one or more of the user's credit accounts. For example, if the user holds a MasterCard™ account, a VISA™ account, and a Discover™ account, the user may present the barcode at a retailer and, upon authentication and authorization of the barcode, the user can select to which account he or she wishes to charge the given transaction. Alternatively, the user may have a separate barcode for each account.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A method for facilitating credit transactions, comprising the steps of:
   receiving a request for a credit voucher from a user via said user's wireless device;
   delivering a transaction code to said user's wireless device;
   upon payment by said user and reading of said transaction code, delivering a second code to said user's wireless device; and
   upon scanning the second code and identifying an account in connection with said second code, crediting said account.

2. A method for facilitating credit transactions, comprising the steps of:
   receiving a request for a credit voucher from a user via wireless device;
   delivering a credit voucher for display on said user's wireless device;
   receiving a deposit payment from said user and information pertaining to said voucher; and
   crediting an account of said user according to said payment.

3. The method of claim 2 wherein said credit voucher is in the form of a 1-D barcode.

4. The method of claim 2 wherein said credit voucher is in the form of a 2-D barcode.

5. The method of claim 2 wherein said voucher includes account identification information.

6. The method of claim 5 wherein said account identification information is a telephone number.

7. The method of claim 5 wherein said account identification information is in the form of a barcode presented on the display of a wireless device.

8. The method of claim 2 including the steps of, prior to delivering said credit voucher, determining an account associated with said user based on said received request, and incorporating account identification information into said credit voucher.

9. A system for facilitating credit transactions, comprising:
   an optical scanning component capable of optically scanning code information, said code information being representative of at least one of: deposit payment information, account identification information and transaction type information;

a transaction apparatus capable of receiving a deposit payment; and a transaction processor for processing said code information, delivering a transaction code to a wireless communications device, and crediting an account corresponding to said account identification information and said deposit payment.

10. The system of claim 9 wherein said transaction processor is adapted to deliver a first transaction code representing account identification information and a second transaction code representing transaction type and amount to said wireless device.

11. The system of claim 9 wherein said transaction code represents account identification information and a credit voucher in the amount of the deposit payment.

12. The system of claim 9 wherein said transaction code represents account identification information and a deposit request in the amount of the deposit payment.

13. The system of claim 9 wherein said transaction code represents a credit voucher in the amount of the deposit payment.

14. The system of claim 9 wherein said code information includes account identification information in the form of a barcode capable of being displayed on a display of said wireless device.

15. The system of claim 9 wherein said transaction apparatus can identify previously scanned codes.

16. The system of claim 9 wherein said transaction processor can invalidate codes prior to their being scanned.

17. The system of claim 9 wherein the transaction apparatus is capable of decoding the code information scanned by said optical scanning component.

* * * * *